United States Patent [19]

Block

[11] 3,835,336

[45] Sept. 10, 1974

[54] PULSE WIDTH SENSING CIRCUIT

[75] Inventor: Dennis Howard Block, Hightstown, N.J.

[73] Assignee: RCA Corporation, New York, N.Y.

[22] Filed: Mar. 23, 1973

[21] Appl. No.: 344,299

[52] U.S. Cl. ................. 307/234, 307/215, 307/251, 307/304, 328/111

[51] Int. Cl. ............................................ H03k 5/20

[58] Field of Search ........... 307/234, 265, 215, 251, 307/304; 328/58, 111, 112

[56] References Cited

UNITED STATES PATENTS

| | | | |
|---|---|---|---|
| 2,947,945 | 8/1960 | Relis et al. | 328/112 |
| 3,676,699 | 7/1972 | Warren | 307/234 |
| 3,727,142 | 4/1973 | De Sipio et al. | 328/111 |

OTHER PUBLICATIONS

"Electrical Filter," by Burke et al., IBM Tech. Disclosure Bulletin, Vol. 12, No. 9, February 1970, pages 1369–1370.

*Primary Examiner*—Stanley D. Miller, Jr.
*Attorney, Agent, or Firm*—H. Christoffersen; Henry I. Schanzer

[57] ABSTRACT

A circuit for producing an output signal indicative of the presence of an input signal of duration greater than a given duration, T. The circuit includes a first stage which in response to a sampling pulse and the presence of an input signal of first value, stores a signal of first binary significance. The circuit also includes a second stage which in response to a shift pulse occurring a time T after the sampling pulse produces at its output, which is the circuit output, a signal corresponding to the one stored in said first stage. Each stage includes means responsive to the input signal for resetting the output of each stage to a level of second binary significance when the input signal has a second value. A signal of first value must, therefore, be present for a duration greater than T to produce an output of first binary significance, where the duration must also include a sampling pulse followed by a shift pulse. The circuit also includes means for, selectively, directly passing the input signals from the input to the output of the circuit.

10 Claims, 8 Drawing Figures

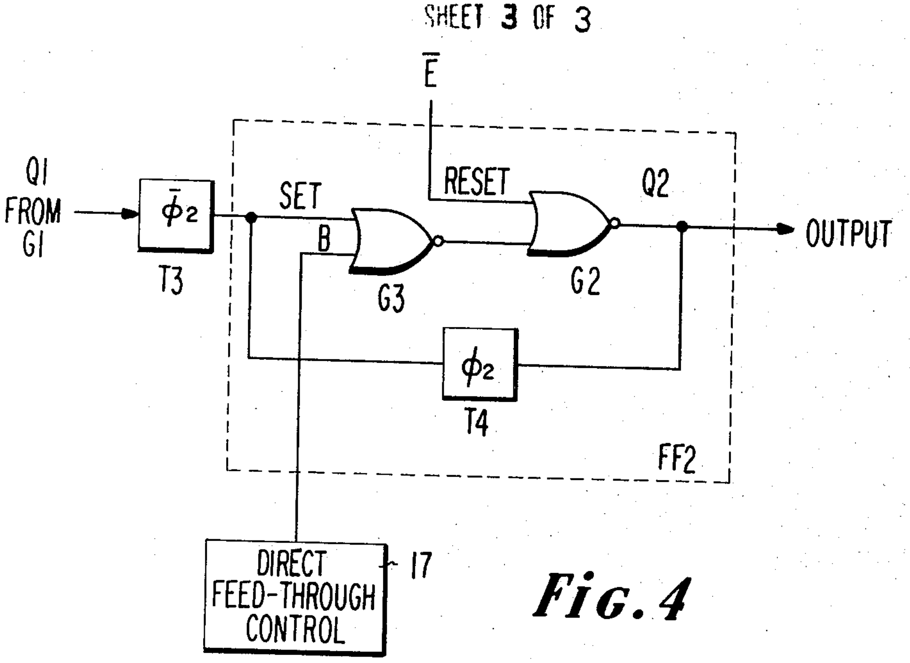
FIG. 4
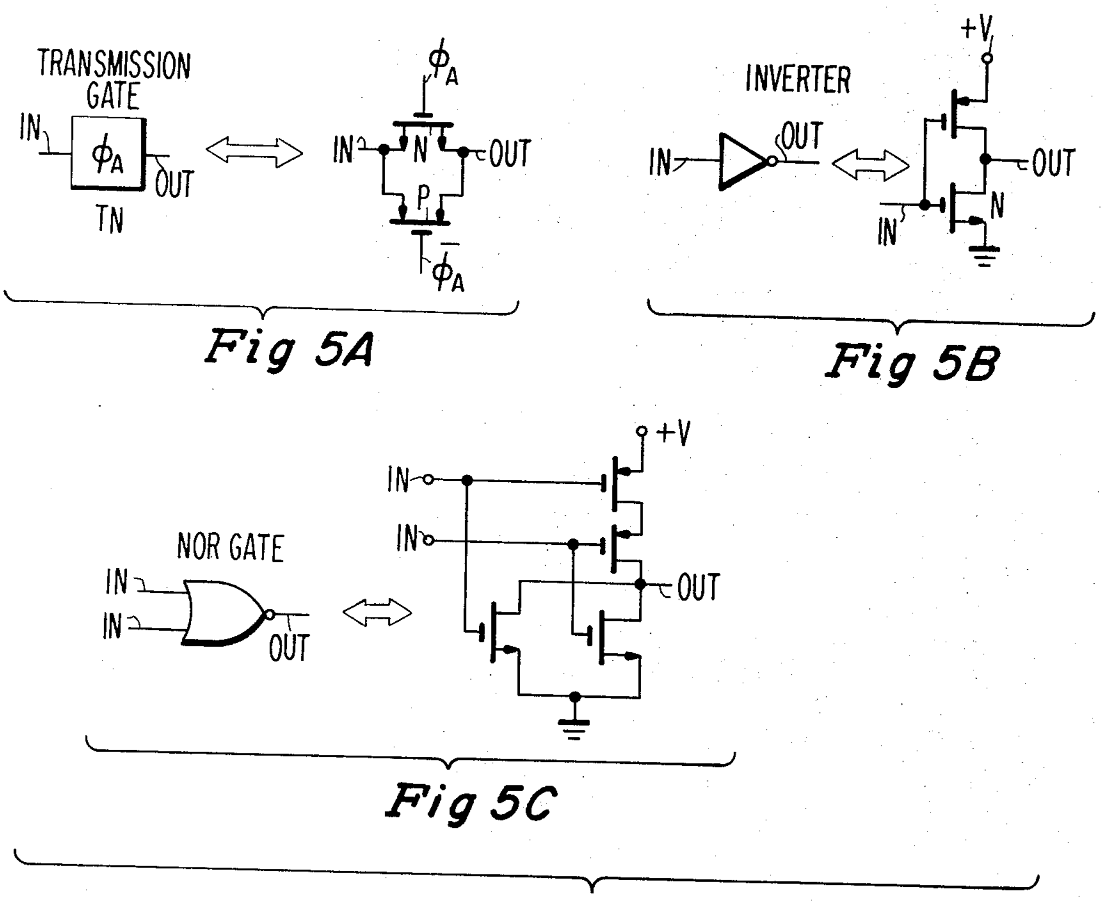
Fig 5A Fig 5B Fig 5C
FIG. 5

PULSE WIDTH SENSING CIRCUIT

This invention relates to digital means for producing output signals indicative of the duration of input signals. There are many applications in which the duration of a signal must be greater than some minimum value to be a valid signal.

A typical example is found in systems for detecting whether an occupant is seated in a car seat. A person seated in a car seat will often bounce up from the seat in the course of travelling over a bumpy road. For the duration of time the person is out of the seat a signal is produced indicating that the seat is not occupied. This input signal is false and must be filtered before being fed to an alarm or other control device. Obviously, there are innumerable applications where the duration of an input signal should be greater than some given minimum value before it is treated as a valid signal.

In circuits embodying the invention the input signal is repetitively sampled by digital techniques to determine its duration. If the signal duration is shorter than a desired duration, T, the signal is treated as noise and is filtered. If the duration, $T_s$, of the signal is greater than T the signal is allowed to pass through the circuit.

It is a feature of the invention that circuits embodying the invention require few components and that these components may be of the type which consume relatively little power and are easy to integrate.

A circuit embodying the invention includes a first stage responsive to a sampling pulse and the presence of an input signal for storing information indicative of the presence of said input signal. The circuit also includes a second stage responsive to a shift pulse occurring a time T after said sampling pulse and to the information stored in said first stage for producing at its output a signal indicative of the presence of said signal for a period equal to or greater than T. Each stage includes means responsive to the absence of a signal for setting each stage to a condition indicative of the absence of an input signal.

In the accompanying drawings like reference characters denote like components, and FIG. 1 is a schematic diagram of a circuit embodying the invention;

FIG. 4 is a schematic diagram illustrating a modification of the second stage of the circuit of FIG. 1 to enable direct feed-through control of the input signal; and FIGS. 5A, 5B and 5C illustrate typical complementary-metal oxide semiconductor (C-MOS) components which may be used to practice the invention.

Figure 1:
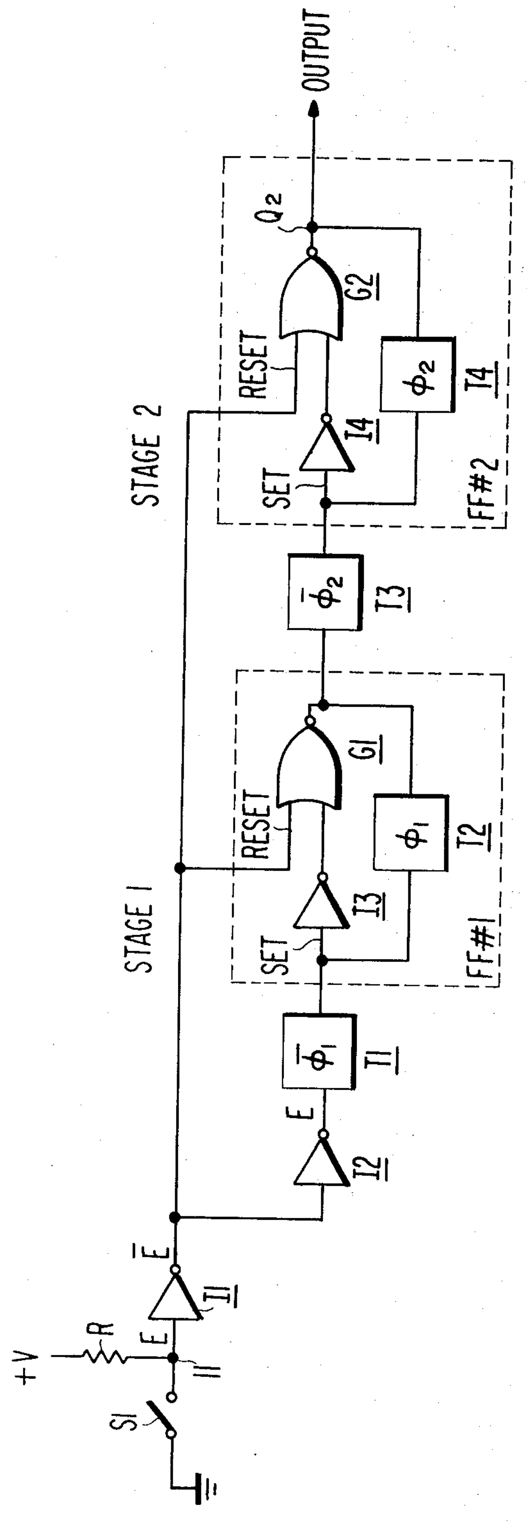

In the circuit of FIG. 1 switch S1 is normally closed maintaining terminal 11 at ground. Switch S1 is used for illustrative purpose only and any other input means performing a similar function could be used instead. Resistor R connected between +V and terminal 11 provides a high input to inverter $I_1$ when switch S1 is opened.

Inverter I1 is connected at its input to input terminal 11 and at its output to the input terminal of inverter I2 and to one of the input terminals of NOR gate G1 and NOR gate G2. The output of inverter I2 is connected to the input of transmission gate T1. The output of gate T1 is connected in common with the output of transmission gate T2 to the input of inverter I3. The output of inverter I3 is connected to the other input of gate G1. The output of gate G1 is connected to the inputs of transmission gates T2 and T3.

The output of gate T3 is connected to the input of inverter I4 and the output of transmission gate T4. The output of inverter I4 is connected to the other input of gate G2 and the output of inverter G2 is connected to the input of gate T4.

When the transmission gates are turned "on" there is a relatively low impedance between their inputs and outputs. With respect to the transmission gates the term input and output is only used figuratively. In fact, when "on" the transmission gate can conduct bidirectionally.

Figure 3:
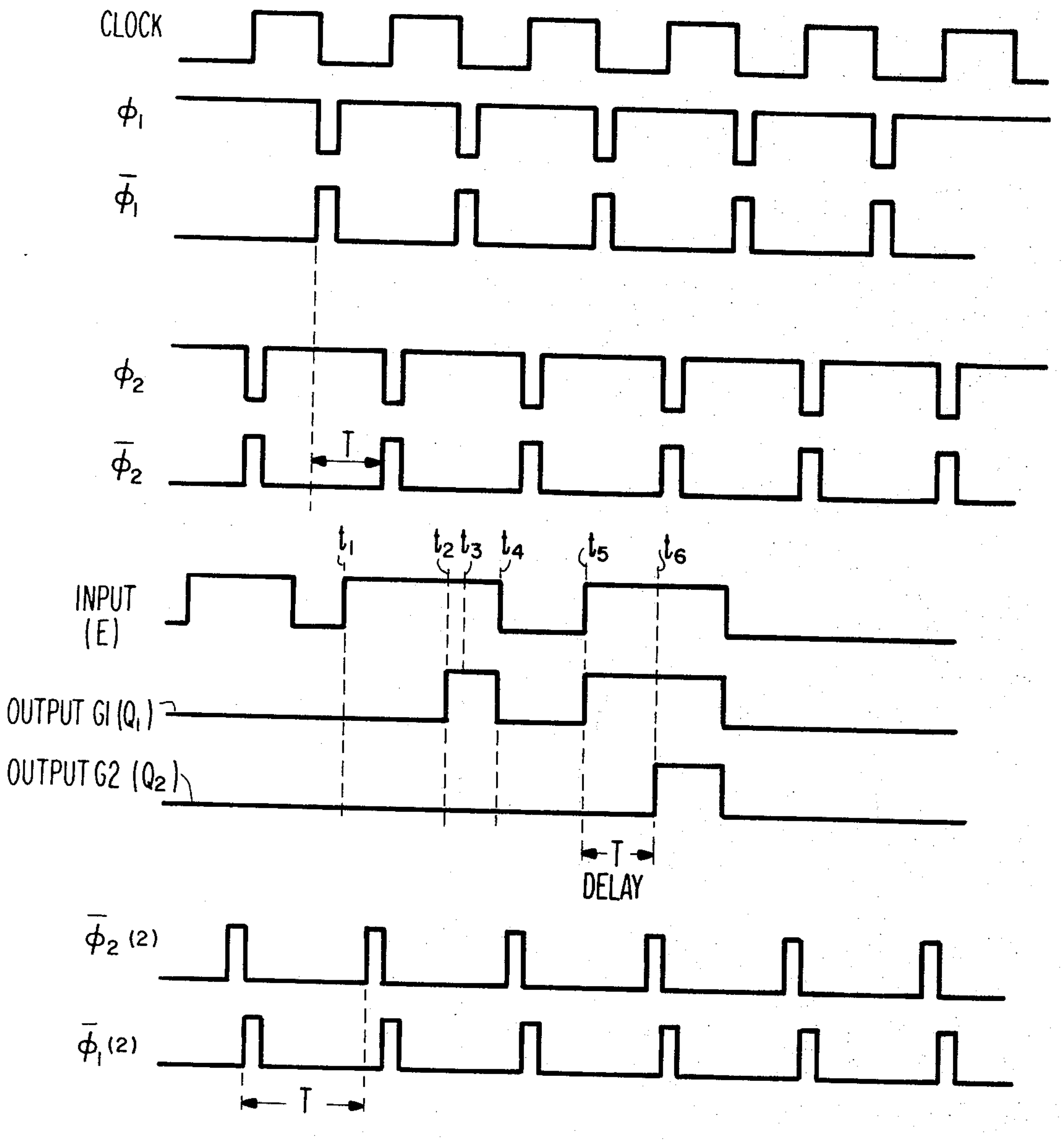
FIG. 3 is a waveform diagram illustrating a typical input waveform and other waveforms associated with the circuits of FIGS. 1 and 2.

When gate T2 is turned on there is a relatively low impedance between the output of gate G1 and the input of inverter I3 and gate G1 and I3 then form a storage element. That is, I3 and G1 form a set-reset flip-flop. The set input is the input to inverter I3, the reset input is one input (so marked) to gate G1 and the output (Q1) of the flip-flop is identically the output of gate G1. Similarly when gate T4 is turned on elements I4 and G2 form a storage element, flip-flop 2, which is the same as flip-flop 1. The clock signals applied to the circuit are shown in FIG. 3. Gate T1 is turned on when $\overline{\phi 1}$ is high and gate T2 is turned on when $\phi 1$ is high.

Gate T1 is turned on for a short interval of time by pulse $\overline{\phi 1}$-high which is denoted the sampling pulse. During the sampling interval new information can be set into the flip-flop. A high input to inverter I3 causes its output to go low and the output of G1 to go high. For the input (E) to I3 to be high the reset input ($\overline{E}$) to G1 must be low. Accordingly, a high input to I3 causes the output (Q1) of G1 to go high. A low input to inverter I3 results from E being low and $\overline{E}$ high. For this condition there are two high inputs to gate G1 and Q1 is forced low. Following the sampling interval $\overline{\phi 1}$ goes low and $\phi 1$ goes high. This turns off gate T1 and turns on gate T2. With T2 turned on, flip-flop 1 latches and the new information is stored in the storage element.

Gate T3 is turned on when $\overline{\phi 2}$ is high and gate T4 is turned on when $\phi 2$ is high. Gate T3 is turned on for a short time interval by pulse $\overline{\phi 2}$ which is denoted the shift pulse. When $\overline{\phi 2}$ is high the output Q1 of flip-flop 1 sets flip-flop 2 to the same signal condition existing in flip-flop 1. That is, the signal Q1 is transferred into the loop comprised of inverter I4 and gate G2. If the reset input to gate G2 is low, G2 inverts the output from I4 and produces at Q2 a signal having the same binary significance as Q1. If the reset input to gate G2 is high, the output, Q2, of G2 is forced low. Following the shift interval, $\overline{\phi 2}$ goes low and $\phi 2$ goes high turning on gate T4. The new information is then latched into flip-flop 2 which now operates as a flip-flop.

Figure 2:
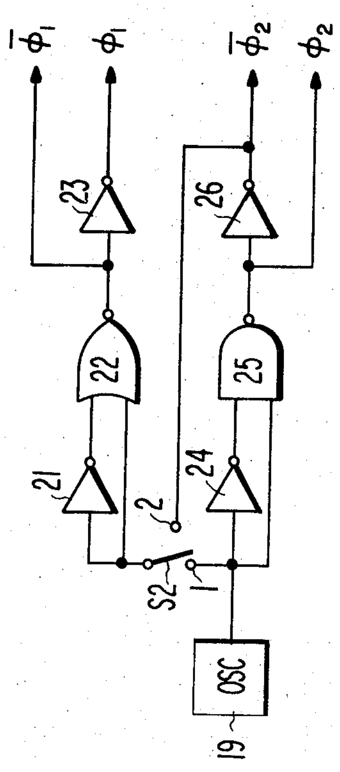
FIG. 2 is a schematic diagram of a circuit for generating the sampling and the shift pulses applied to the circuit of FIG. 1.

The sampling and shift pulses applied to the transmission gates may be generated by a circuit of the type shown in FIG. 2. The circuit of FIG. 2 includes an oscillator 19 which may be any one of a well-known group of elements capable of producing a repetitive waveform. For purpose of illustration the output of the oscillator is assumed to be as shown in the waveform labelled "clock" in FIG. 3. With the switch S2 in position 1, the output of oscillator 19 is connected to one input of inverter 21 and one input of NOR gate 22. The output of inverter 21 is connected to the other input of gate 22. Inverter 21 and NOR gate 22 form a negative edge detector producing a narrow positive going pulse $\bar{\phi}$1, every time the clock goes negative. The characteristics of the $\bar{\phi}$1 pulses are illustrated in the waveform labelled $\bar{\phi}$1 in FIG. 3. Inverter 23 inverts the $\bar{\phi}$1 pulses to produce the negative going pulse labelled $\phi$1 as shown in FIG. 3. The output of oscillator 19 is also connected to one input of inverter 24 and to one input of NAND gate 25. The output of inverter 24 is connected to the other input of gate 25. Inverter 24 and gate 25 form a positive edge detector producing a narrow negative going pulse $\phi$2 every time the clock goes positive. The characteristics of the $\phi$2 pulse are illustrated in the waveform labelled $\phi$2 in FIG. 3. Inverter 26 inverts the output of gate 25 and produces narrow positive going pulses having characteristics shown in the correspondingly labelled waveform in FIG. 3.

In the circuit of FIG. 2 if the switch S2 is put in position 2 there is produced a circuit arrangement for producing $\phi$1 pulses from $\phi$2 pulses. This arrangement is more efficient than that for switch S2 in position 1 in that substantially the full period between a sampling pulse and a shift pulse is used for delay. In this arrangement, the input to inverter 21 and gate is the output $\bar{\phi}$2 from gate 26. For this arrangement, the sampling pulse, $\bar{\phi}$1, and the shift pulse $\bar{\phi}$2 would have the characteristics shown for the waveform labelled $\bar{\phi}$1(2) and $\bar{\phi}$2(2) in FIG. 3.

In the operation of the circuit of FIG. 1 the input signal (E) is normally low and the output of inverter I1 is normally high forcing the outputs of gates G1 and G2 to be low. Assume for purpose of illustration that switch S1 opens and closes to produce the waveform labelled E shown in FIG. 3.

When E goes high at time $t_1$ ($\bar{E}$ goes low) the input to gate T1 goes high but there is no transfer of this information into the first or second flip-flop. At time $t_2$, on the next positive going sampling pulse, $\bar{\phi}$1, the input signal, E, is transferred through T1 to the input of inverter I3. The output of I3 is then inverted by G1 to produce a high output at Q1. At time $t_3$, $\phi$1 goes high, gate T2 is turned on and gate T1 is turned off and the information that E is high gets stored in flip-flop 1. If the input signal, E, returns to the low condition, at any time before the occurrence of a shift pulse, the reset input ($\bar{E}$) to G1 goes high and the output of G1 is forced to the low condition and the output of G2 remains unchanged at the low level. This is illustrated for E going low at time $t_4$. Thus, an input signal whose duration does not encompass a sampling interval and a shift interval is filtered out of the system.

At time $t_5$, E goes high and since $\bar{\phi}$1 is high the output Q1, of G1 goes high. If E remains high at time $t_6$ the shift pulse, $\bar{\phi}$2, goes high and transmission gate T3 is turned on. The high output of G1 is now applied to the input of inverter I4 causing a low input to be applied to one input of gate G2. Since $\bar{E}$ is low there is applied a second low input to gate G2 causing its output to go high. Thus, the output, Q2, goes high if the input signal E maintains its level for a period greater than T, where T includes a sampling pulse, $\bar{\phi}$1, and a shifting pulse, $\bar{\phi}$2.

The outputs of gates G1 and G2 remain high so long as the input is high. When E goes low, $\bar{E}$ goes high resetting flip-flop 1 and 2 and forcing the outputs of G1 and G2 to go low. The leading edge of an input pulse is delayed for a minimum time, T, before being passed to the output. But note that the falling edge is not delayed, that is, the output terminates in time coincidence with the return to 0 (or absence) of the input signal. In this circuit E high may be considered to be the presence of a signal and E — low the absence of a signal. Applying the reset input E to one of the input terminals of gates G1 and G2 ensures that when E is low that Q1 and Q2 are immediately forced to the reset or low condition. It should be appreciated that when the reset input ($\bar{E}$) is low gates G1 and G2 are enabled allowing G1 and G2 to function as inverters and that when the reset input ($\bar{E}$) is high gates G1 and G2 are effectively disabled, their outputs being forced to the low condition.

It takes a sampling delay of duration T for the incoming signal to reach the output of the circuit for further processing. This delay, depending on the clock frequency, amy vary over a very wide range of time. However, under some circumstances it is necessary that the delay be eliminated. This may be achieved by the arrangement shown in FIG. 4. In the circuit of FIG. 4 flip-flop 2 includes a two input NOR gate G3 instead of an inverter, 14, as in FIG. 1. One of the two inputs of gate G3 is connected to the output of gate T3 and its other input is connected to the output of direct feed-through control, 17. The direct feed-through control, 17, produces a signal B, which is normally low. When B is low gate G3 operates as an inverter and the operation of the circuit is then identical to that of FIG. 1. However, when the signal B goes high the output of gate G3 is forced low. One input to gate G2 is the low output of gate G3 and the other input to gate G2 is $\bar{E}$. Whenever E goes high $\bar{E}$ goes low and the output of gate G2 goes high and when E goes low, $\bar{E}$ goes high and the output of gate G2 goes low. The output of gate G2, which is the output of the circuit thus follows all the perturbations of the input signal regardless of the occurrence of the sampling and shifting pulses. In the circuit of FIG. 4 under the condition of B high, the sampling delay and the shifting delays are bypassed and the input signal is transferred to the output with at most two gate delays. In this circuit it should be appreciated that gate G3 serves a double function. When B is low, gate G3 is enabled. That is, any input appearing at the "set" input of G3 is inverted but passes through the gate. When B is high gate G3 is disabled. That is, its output is forced low and signals (i.e., a low) on the set input does not pass through the gate. This function is achieved using very few components.

A feature of the invention is that the components necessary to practice the invention are few. Another feature is that these components may be of the type which require very little power. FIG. 5A illustrates that each one of transmission gates T1, T2, T3 and T4 may be a complementary transistor transmission gate. Each transmission gate would include one insulated-gate-field-effect transistor (IGFET) of N conductivity type having its conduction path connected in parallel with the conduction path of a second IGFET of P conductivity type. Each one of inverters I1, I2, I3 and I4 may be a complementary inverter of the type shown in FIG. 5B. That is, each inverter may include a first IGFET of P conductivity type and a second IGFET of N conductivity type, where the two transistors have their gates connected to a common input point and their drains connected to a common output point, with the source of the P-type IGFET being connected to the most positive circuit potential and the source of the N-type IGFET being connected to the most negative circuit potential. NOR gates G1, G2 and G3 could be of the type shown in FIG. 5C. FIG. 5C is illustrative of a NOR gate employing complementary IGFETS. Two transistors of P conductivity type have their conduction paths connected in series between the most positive point of potential and a common output and the two transistors of N conductivity type have their conduction paths connected in parallel between the common output and the most negative circuit potential. The gate of one P transistor is connected to the gate of one N transistor at a first input point and the gate of the other P transistor is connected to the gate of the other N transistor at a second input point.

It should be appreciated that the use of transmission gates for transferring information into flip-flop 1 or into flip-flop 2 makes use of a very small number of components to perform the transfer function during the sampling or shifting interval. Furthermore, these gates consume extremely little power.

It should also be appreciated that flip-flop 1 and flip-flop 2 make use of a very few components. For example, in flip-flop 1 and flip-flop 2, the two input NOR gates serve a double function. When the reset is low, the gates are used as inverters to form a flip-flop and when the reset is high the gates reset the output of the flip-flops. Similarly, in FIG. 4 the use of two input NOR gate G3 to provide direct feed-through control for one signal condition and an inverting function in the sampling mode condition minimizes the number of components used in the circuit.

Integrated circuits embodying the invention have been manufactured. Due to the few components required the chip area occupied by circuits embodying the invention is small. Since there are few components, little metal is required to interconnect the components. Furthermore, since the signal flow is in one direction from input to output and since there are no feedback paths, circuits embodying the invention may be manufactured with very little metalization. This further minimize the amount of chip area required to fabricate the circuit in integrated circuit form.

What is claimed:

1. The combination comprising:

an input terminal for the application thereto of an input signal;

first and second means;

means for applying sampling pulses to said first means and means for applying shift pulses to said second means, where each shift pulse occurs a time T after a sampling pulse;

first and second signal storing means;

means coupling said first means between said input terminal and said first storing means, said first means being responsive to the presence of an input signal and a sampling pulse for setting said first storing means to a first condition indicative of the presence of a signal;

means coupling said second means between said first and second storing means, said second means being responsive to the presence of a shift pulse and the signal stored in said first storing means for setting said second storing means to the condition stored in said first storing means; and means coupled to said first and second storing means and responsive to the absence of a said input signal for setting said first and second storing means to a second condition indicative of the absence of an input signal.

2. The combination as claimed in claim 1 wherein each one of said signal storing means includes, two inverting means each having an input and an output and a transmission gate; one inverting means being connected at its input to the output of the other inverting means and wherein said transmission gate is coupled between the input of the other inverting means and the output of said one inverting means;

wherein each one of said first and second means includes a transmission gate means coupled to the input of one of the two inverting means of the storing means to which it is coupled; and wherein said means coupled to said first and second storing means includes an inverter having an input and an output, wherein the inverter input is connected to said input terminal and the inverter output is connected to said first and second storing means.

3. The combination as claimed in claim 2 wherein said means for applying sampling pulses to said first means includes means for applying said sampling pulses to the transmission gate of said first means, and wherein said means for applying shift pulses to said second means includes means for applying said shift pulses to the transmission gate of said second means.

4. The combination as claimed in claim 3 wherein said means for applying said sampling and shift pulses include means for applying the complement of said signals;

wherein the complement of said sampling pulses are applied to the transmission gate of said first storing means for opening it when the transmission gate of said first means is closed; and wherein the complement of said shift pulses are applied to the transmission gate of said second storing means for opening it when the transmission gate of said second means is closed.

5. The combination as claimed in claim 1 wherein each one of said storing means has a set input and a reset input and an output;

wherein said first means includes a transmission gate, responsive to said sampling pulses, coupled between said input terminal and the set input of said first storing means; and wherein said second means includes a transmission gate responsive to said shift pulses coupled between the output of said first storing means and the set input of said second storing means.

6. The combination as claimed in claim 5 wherein said means responsive to the absence of a signal include means for inverting the signal present at said input terminal and supplying the inverted signal to the reset input of said first and second storing means.

7. The combination as claimed in claim 1 further including means responsive to a control signal for setting said second storing means to a condition enabling the passage of an input signal from said input terminal to the output of said second signal storing means without the signal being delayed by said sampling pulse or said shift pulse.

8. The combination comprising:

an input terminal for the application thereto of input signals;

first and second two state storing means, each having a set input, a reset input and an output;

first transmission gate means coupled between said input terminal and the set input of said first storing means;

second transmission gate means coupled between the output of said first storing means and the set input of said second storing means;

means for enabling said first transmission gate means for setting said first storing means to one binary condition during a sampling interval in response to an input signal of one value;

means for enabling said second transmission gate means for setting said second storing means to said one binary condition during a shift interval, said shift interval occurring a time T after said sampling interval; and means coupled to the reset inputs of said first and second storing means responsive to said input signals having a second value for setting said first storing and second storing means to the other binary condition.

9. The combination as claimed in claim 8 wherein said second storing means includes first and second two input NOR gates, and a transmission gate; the output of the first NOR gate being connected to one input of the second NOR gate and the transmission gate coupling the output of the second NOR gate to one input of the first NOR gate;

means for directly applying the complement of the input signal to the other input of said NOR gate;

means for applying a control signal to the other input of said first NOR gate for producing at its output a signal enabling the signal present at the other input of said second NOR gate to pass through said second NOR gate without delay; and wherein said means coupled to the reset inputs includes an inverter having an input and an output, wherein the input of the inverter is connected to said input terminal and wherein the output of the inverter is connected to said reset inputs.

10. The combination as claimed in claim 9 wherein said transmission gate means includes two complementary insulated-gate field-effect transistors having their conduction paths connected in parallel;

wherein each one of said first and second storing means includes an inverter and a two input NOR gate cross coupled to form a flip-flop; and wherein said inverter and said NOR gate are comprised of complementary insulated-gate field-effect transistors.

* * * * *